(12) United States Patent
Smith et al.

(10) Patent No.: US 11,366,771 B2
(45) Date of Patent: Jun. 21, 2022

(54) HOST DEVICE WITH MULTI-PATH LAYER CONFIGURED FOR DETECTION AND RESOLUTION OF INITIATOR-RELATED CONDITIONS

(71) Applicant: EMC IP Holding Company LLC, Hopkinton, MA (US)

(72) Inventors: Erik P. Smith, Douglas, MA (US); Ron Arnan, Nes-Ziona (IL); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 208 days.

(21) Appl. No.: 16/401,280

(22) Filed: May 2, 2019

(65) Prior Publication Data
US 2020/0349094 A1 Nov. 5, 2020

(51) Int. Cl.
G06F 3/00 (2006.01)
G06F 13/16 (2006.01)
G06F 13/40 (2006.01)
H04L 67/1097 (2022.01)
G06F 11/34 (2006.01)
(Continued)

(52) U.S. Cl.
CPC ...... *G06F 13/1668* (2013.01); *G06F 11/3041* (2013.01); *G06F 11/3409* (2013.01); *G06F 13/4027* (2013.01); *G06N 20/00* (2019.01); *H04L 67/1097* (2013.01)

(58) Field of Classification Search
CPC ............ H04L 67/1097; G06F 11/3409; G06F 13/1668; G06F 11/3041; G06F 11/3034; G06F 13/4027; G06F 11/3485; G06N 20/00

USPC ........................................................... 710/5
See application file for complete search history.

(56) References Cited

U.S. PATENT DOCUMENTS 6,687,746 B1 2/2004 Shuster et al.
6,697,875 B1 2/2004 Wilson
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Chun Kuan Lee
(74) *Attorney, Agent, or Firm* — Ryan, Mason & Lewis, LLP

(57) ABSTRACT

An apparatus comprises a host device configured to communicate over a network with a storage system. The host device comprises a plurality of host bus adaptors, and a multi-path input-output driver configured to control delivery of input-output operations from the host device to the storage system over selected ones of a plurality of paths through the network. The paths are associated with respective initiator-target pairs wherein each of the initiators comprises a corresponding one of the host bus adaptors and each of the targets comprises a corresponding one of a plurality of ports of the storage system. The host device monitors performance of the ports in processing input-output operations delivered thereto, detects an initiator-related condition based at least in part on the monitored performance, and automatically adjusts an assignment of one or more of the initiators to one or more of the targets based at least in part on the detected initiator-related condition.

20 Claims, 3 Drawing Sheets

(51) Int. Cl.
*G06N 20/00* (2019.01)
*G06F 11/30* (2006.01)

(56) References Cited

U.S. PATENT DOCUMENTS

| | | | |
|---|---|---|---|
| 7,275,103 B1* | 9/2007 | Thrasher | H04L 45/22 709/223 |
| 7,454,437 B1 | 11/2008 | Lavallee et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,904,681 B1 | 3/2011 | Bappe et al. | |
| 7,925,872 B2 | 4/2011 | Lai et al. | |
| 9,400,611 B1 | 7/2016 | Raizen | |
| 9,594,780 B1 | 3/2017 | Esposito et al. | |
| 9,778,852 B1 | 10/2017 | Marshak et al. | |
| 2004/0010563 A1 | 1/2004 | Forte et al. | |
| 2008/0043973 A1 | 2/2008 | Lai et al. | |
| 2008/0301333 A1* | 12/2008 | Butler | H04L 67/101 710/38 |
| 2009/0063716 A1* | 3/2009 | Mopur | G06F 3/0611 710/6 |
| 2011/0197027 A1 | 8/2011 | Balasubramanian et al. | |
| 2015/0074301 A1* | 3/2015 | Kawamura | G06F 13/102 710/104 |
| 2016/0028616 A1* | 1/2016 | Vasseur | H04L 47/50 370/412 |
| 2016/0117113 A1 | 4/2016 | Li et al. | |

OTHER PUBLICATIONS

NVM Express, "NVM Express, Revision 1.3," NVM Express, May 1, 2017, 282 pages.
VMware, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
U.S. Appl. No. 15/849,828 filed in the name of Sanjib Mallick et al., filed Dec. 21, 2017 and entitled "Storage System with Input-Output Performance Control Utilizing Application Process Detection."
U.S. Appl. No. 15/795,653 filed in the name of Maneesh Pusalkar et al., filed Oct. 27, 2017 and entitled "Storage System with Network-Wide Configurable Device Names."
U.S. Appl. No. 16/142,274 filed in the name of Sanjib Mallick et al., filed Sep. 26, 2018 and entitled "Host Device with Multi-Path Layer Implementing Automatic Standby Setting for Active-Active Configuration."

* cited by examiner

HOST DEVICE WITH MULTI-PATH LAYER CONFIGURED FOR DETECTION AND RESOLUTION OF INITIATOR-RELATED CONDITIONS

FIELD

The field relates generally to information processing systems, and more particularly to storage in information processing systems.

BACKGROUND

Storage arrays and other types of storage systems are often shared by multiple host devices over a network. However, problems can arise in such arrangements when paths from one or more of the host devices to the storage system experience performance degradations. The performance degradations are often manifested in the form of poor response times that can appear to indicate a problem in the storage system but are actually due to issues that are addressable in the host device. It is therefore particularly difficult in many such cases for a host administrator to distinguish between a host device issue and a storage system issue.

As a result, much time can be wasted under current practice in troubleshooting the storage system responsive to an apparent response time degradation when the actual problem relates to configuration and utilization of the paths from the host device to the storage system. Moreover, conventional techniques for addressing such path performance issues in the host device typically involve tedious and time-consuming manual reconfiguration operations that also require rebooting of the host device.

SUMMARY

Illustrative embodiments configure a multi-path layer of one or more host devices to include functionality for detection and resolution of initiator-related conditions in conjunction with communication with a storage array or other type of storage system via a storage area network (SAN) or other type of network. The multi-path layer illustratively comprises at least one multi-path input-output (MPIO) driver configured to process input-output (IO) operations of at least one host device.

In some embodiments, a given "initiator-related condition" comprises a performance issue associated with a target port of the storage system that adversely impacts at least one corresponding initiator of the host device. Initiator-related conditions of this type can be efficiently detected and resolved using techniques disclosed herein.

Such embodiments can advantageously avoid the time wasted under current practice in troubleshooting the storage system responsive to an apparent response time degradation when the actual problem relates to configuration and utilization of the paths from the host device to the storage system. In addition, the above-noted need for tedious and time-consuming manual reconfiguration of the host device and any associated rebooting of the host device are avoided in illustrative embodiments.

In one embodiment, an apparatus comprises a host device configured to communicate over a network with a storage system comprising a plurality of storage devices. The host device comprises a plurality of host bus adaptors (HBAs), and an MPIO driver configured to control delivery of IO operations from the host device to the storage system over selected ones of a plurality of paths through the network. The paths are associated with respective initiator-target pairs wherein each of the initiators comprises a corresponding one of the HBAs of the host device and each of the targets comprises a corresponding one of a plurality of ports of the storage system. The host device is further configured to monitor performance of the ports of the storage system in processing IO operations delivered thereto, to detect an initiator-related condition based at least in part on the monitored performance of the ports, and to automatically adjust an assignment of one or more of the initiators to one or more of the targets based at least in part on the detected initiator-related condition.

As one example, automatically adjusting an assignment of one or more of the initiators to one or more of the targets based at least in part on the detected initiator-related condition illustratively comprises shifting at least one of the initiators from a current target corresponding to a first port having a relatively high IO processing load to an updated target corresponding to a second port having a relatively low IO processing load.

As another example, automatically adjusting an assignment of one or more of the initiators to one or more of the targets based at least in part on the detected initiator-related condition illustratively comprises adjusting at least one mapping of initiators, targets and logical devices that indicates for each of the initiators at least one target that is to be used to communicate with a given logical device of the storage system.

Numerous other types of adjustments in assignment of one or more of the initiators to one or more of the targets can be made based at least in part on at least one detected initiator-related condition.

Additionally or alternatively, one or more automated actions may be taken responsive to detection of the initiator-related condition. For example, the one or more automated actions can involve altering a scheduling algorithm, load balancing algorithm or other type of algorithm utilized in path selection for delivery of IO operations. Such automated actions can also advantageously permit the avoidance of additional initiator-related conditions that might otherwise have arisen.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
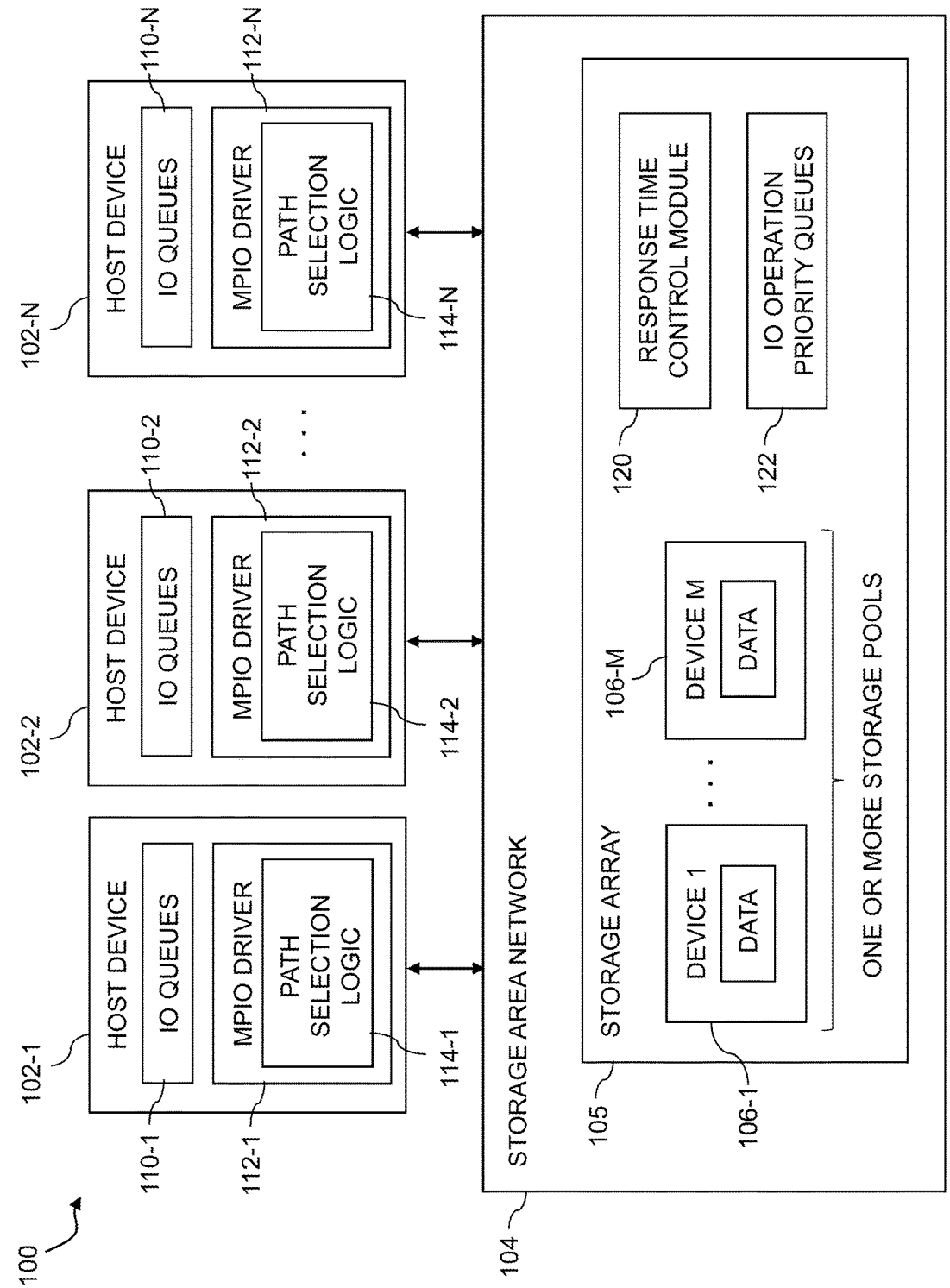
FIG. 1 is a block diagram of an information processing system configured with functionality for detection and resolution of initiator-related conditions utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, ... 102-N. The host devices 102 communicate over a storage area network (SAN) 104 with at least one storage array 105. The storage array 105 comprises a plurality of storage devices 106-1, ... 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for detection and resolution of initiator-related conditions using respective instances of path selection logic 114-1, 114-2, . . . 114-N implemented within the MPIO drivers 112.

The MPIO drivers 112 may comprise, for example, otherwise conventional MPIO drivers, such as PowerPath® drivers from Dell EMC, suitably modified in the manner disclosed herein to detect and resolve initiator-related conditions. Other types of MPIO drivers from other driver vendors may be suitably modified to incorporate functionality for detection and resolution of initiator-related conditions as disclosed herein.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

The MPIO driver 112-1 is further configured to monitor performance of the ports of the storage array 105 in processing IO operations delivered thereto, to detect an initiator-related condition based at least in part on the monitored performance of the ports, and to automatically adjust an assignment of one or more of the initiators to one or more of the targets based at least in part on the detected initiator-related condition.

A more detailed example of an arrangement of this type is described below in conjunction with the embodiment of FIG. 2.

Additionally or alternatively, the MPIO driver 112-1 can initiate one or more other automated actions responsive to the detected initiator-related condition.

A given "initiator-related condition" as that term is broadly used herein is intended to encompass, for example, a performance issue associated with a target port of the storage array 105 that adversely impacts at least one corresponding initiator of the host device 102-1. Such initiator-related conditions can have significant negative consequences, including an inability to send or received desired payload, storage array response time spikes due to command completion delays, and substantial degradations in application performance. As will be described in more detail below, initiator-related conditions of this type can be efficiently detected and resolved using techniques disclosed herein.

Although operations such as monitoring performance of ports of the storage array 105, detecting at least one initiator-related condition, and automatically adjusting an assignment of one or more initiators to one or more targets are controlled by or otherwise implemented at least in part by the MPIO driver 112-1 in the present embodiment, this is by way of example rather than limitation. In other embodiments, at least portions of these operations can be carried out elsewhere in the host device 102-1.

In some embodiments, detecting an initiator-related condition based at least in part on the monitored performance of the ports of the storage array 105 comprises implementing a machine learning algorithm to detect deviations from one or more learned characteristics relating to the IO operations. Such a machine learning algorithm can comprise, for example, a deep learning neural network or other type of neural network, as well other types of artificial intelligence algorithms configured to learn characteristics over time. The one or more learned characteristics relating to the IO operations as determined by the machine learning algorithm illustratively comprise burst length, application correlation and/or change rate, although other IO characteristics can be used in other embodiments.

The machine learning algorithm in some embodiments runs on the host device 102-1. Alternatively, such a machine learning algorithm can run on another one of the host devices 102. It is possible in some embodiments that a particular one of the host devices 102 can be dedicated to executing machine learning algorithms or performing other types of analytics for other ones of the host devices 102.

Initiator-related conditions can be detected in some embodiments through detection of significant deviations from the learned characteristics for particular initiators, targets, initiator-target pairs and/or logical devices. Such logical devices include what are referred to herein as LUNs or other logical storage volumes, and in some cases these and other logical devices are also referred to as logical storage devices.

Numerous additional or alternative initiator-related condition detection criteria can be used. For example, detecting an initiator-related condition based at least in part on the monitored performance of the ports can comprise detecting one or more initiators that each have a level of utilization below a specified threshold, detecting at least one initiator that is a candidate for assignment to a different target, and/or detecting at least one target that is a candidate for assignment to a different initiator.

In some embodiments, automatically adjusting an assignment of one or more of the initiators to one or more of the targets based at least in part on the detected initiator-related condition comprises shifting at least one of the initiators from a current target corresponding to a first port having a relatively high IO processing load to an updated target corresponding to a second port having a relatively low IO processing load.

Additionally or alternatively, automatically adjusting an assignment of one or more of the initiators to one or more of the targets based at least in part on the detected initiator-related condition illustratively comprises adjusting at least one mapping of initiators, targets and logical devices that indicates for each of the initiators at least one target that is to be used to communicate with a given logical device of the storage array 105.

The MPIO driver 112-1 is further configured in some embodiments to initiate an automated reconfiguration process to redefine zoning and masking information that characterizes relationships between the initiators and the targets responsive to the automatically adjusting of the assignment of one or more of the initiators to one or more of the targets, and/or to initiate an automated path discovery process to discover new paths through the SAN 104 responsive to the automatically adjusting of the assignment of one or more of the initiators to one or more of the targets.

These and other operations referred to herein as being performed by or under the control of the MPIO driver 112-1 can in some embodiments be performed at least in part outside of the MPIO driver 112-1, such as in the host device 102-1 generally.

In some embodiments, a predetermined command is sent from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

As noted above, the MPIO driver 112-1 illustratively initiates one or more automated actions responsive to the detected initiator-related condition. Such automated actions can also be performed at least in part by the MPIO driver 112-1, rather than just initiated by the MPIO driver 112-1, but can additionally or alternatively be performed at least in part by other components of the host device 102-1 or the system 100.

The one or more automated actions in some cases are configured to provide what is also referred to herein as "resolution" of a detected initiator-related condition. The resolution of a detected initiator-related condition as that term is broadly used is intended to encompass one or more actions that at least partially alleviate the detected initiator-related condition.

For example, as indicated above, a given automated action initiated by the MPIO driver 112-1 responsive to a detected initiator-related condition illustratively comprises automatically adjusting an assignment of one or more of the initiators to one or more of the targets based at least in part on the detected initiator-related condition.

As another example, a given automated action initiated by the MPIO driver 112-1 responsive to a detected initiator-related condition illustratively comprises initiating automated deployment of one or more additional paths associated with respective spare communication links between the host device 102-1 and the storage array 105.

As a further example, a given automated action initiated by the MPIO driver 112-1 responsive to the detected initiator-related condition comprises initiating generation of a notification of the initiator-related condition for delivery to a host administrator. The notification for delivery to the host administrator illustratively comprises an indication of an amount of additional link bandwidth needed for one or more of the paths in order to alleviate the detected initiator-related condition. The host device 102-1 can then be reconfigured to provide the needed additional link bandwidth, thereby resolving the detected initiator-related condition, as well as helping to avoid future initiator-related conditions that might have otherwise occurred without the additional link bandwidth.

Additionally or alternatively, an automated action initiated by the MPIO driver 112-1 responsive to the detected initiator-related condition can comprise initiating generation of a notification for delivery to the storage array 105. Such a notification for delivery to the storage array 105 illustratively comprises a "vendor unique command" or VU command in an otherwise standardized command format, such as a SCSI command format, although other command formats may be used.

Yet another example of an automated action that may be initiated by the MPIO driver 112-1 comprises initiating an adjustment to an algorithm utilized in path selection for delivery of IO operations from the set of IO queues 110-1 to the storage array 105. Such an algorithm illustratively comprises a scheduling algorithm, load balancing algorithm or other type of algorithm utilized in selecting IO operations for delivery over particular selected ones of multiple available paths. A given such algorithm can incorporate both scheduling and load balancing functionality.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

As indicated previously, absent use of the initiator-related condition detection and resolution techniques in a multi-path layer as disclosed herein, it can be difficult for a host administrator to distinguish between a host device issue and a storage system issue. As a result, much time can be wasted under current practice in troubleshooting the storage system responsive to an apparent response time degradation when the actual problem is addressable in the host device. Unaddressed initiator-related conditions can have significant negative consequences, such as an inability to send or receive desired payload, storage array response time spikes due to command completion delays, and substantial degradations in application performance.

Such drawbacks are advantageously overcome in illustrative embodiments herein by utilization of a multi-path layer comprising one or more of the MPIO drivers 112 to detect and resolve initiator-related conditions as described above.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

As indicated previously, the host device 102-1 may be configured to generate a notification for delivery to a host administrator responsive to detection of an initiator-related condition for the given path. Additionally or alternatively, the host device 102-1 may be configured to generate a notification for delivery to the storage array 105 responsive to detection of the initiator-related condition for the given path. Other types of reporting arrangements are utilized in other embodiments.

The above-described functions associated with initiator-related condition detection and resolution functionality of the MPIO driver 112-1 are carried out at least in part under the control of its path selection logic 114-1. For example, the path selection logic 114-1 is illustratively configured to control performance of the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105 and the MPIO drivers 112 of such other host devices are each similarly configured to deliver IO operations from its corresponding one of the sets of IO queues 110 to the storage array 105 over selected paths through the SAN 104, and to perform the disclosed functionality for detection and resolution of initiator-related conditions.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support detection and resolution of initiator-related conditions.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array

105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, now U.S. Pat. No. 10,474,367, and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
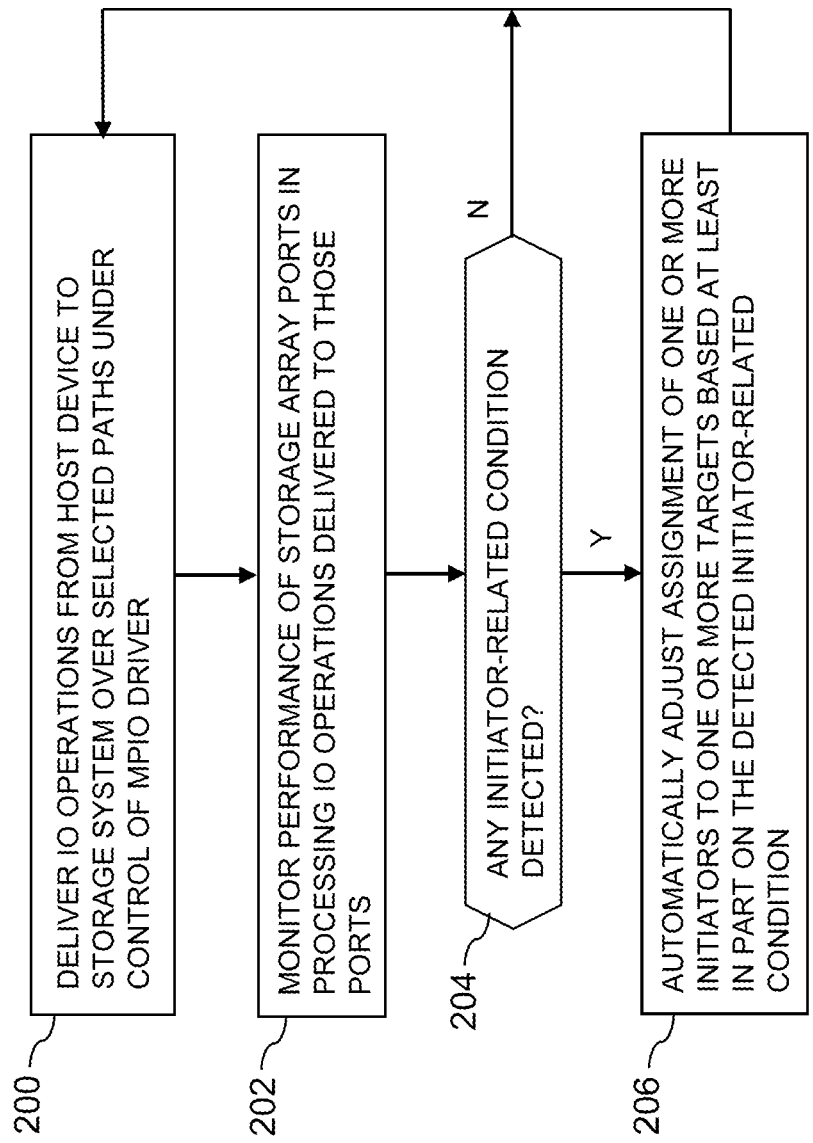
FIG. 2 is a flow diagram of a process for detection and resolution of initiator-related conditions utilizing a multi-path layer of a host device in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Other arrangements of host device components and/or other system components can be configured to perform at least portions of one or more of the steps in other embodiments.

In step 200, IO operations are delivered from the host device to the storage system over selected paths under the control of an MPIO driver. For example, one or more IO operations selected from one or more queues of a given set of queues of the host device are illustratively directed to a particular logical storage device of the storage array over a selected one of a plurality of available paths, with each such path being associated with a different initiator-target pair, where the initiators comprise respective HBAs of the host device and the targets comprise respective ports of the storage array.

At least some of the paths from the host device to the storage array may be determined using an initial path discovery scan performed in conjunction with booting of the host device. It is assumed for the description of this embodiment that the host device has discovered a plurality of paths to the storage array, and further that at least one logical storage device of the storage array is visible to the host device on each of the paths.

The path discovery scan can be repeated responsive to one or more detected path changes or under other specified conditions. For example, a storage administrator or other user may perform zoning and/or masking changes to the storage array that result in at least one new path becoming available to the host device. Accordingly, the set of multiple paths over which IO operations are delivered from the host device to particular logical devices of the storage array can change over time.

In step 202, performance of storage array ports in processing IO operations delivered to those ports is monitored. For example, various port load monitoring tools can be used to monitor port performance.

In step 204, a determination is made as to whether or not any initiator-related condition has been detected. If at least one initiator-related condition has been detected, the process moves to step 206, and otherwise returns to step 200 as indicated.

In step 206, an assignment of one of more initiators to one or more targets is adjusted based at least in part on the detected initiator-related condition. This assignment adjustment is an example of an automated action that is taken responsive to the detection of at least one initiator-related condition.

Additional or alternative steps can be used in other embodiments. For example, the MPIO driver or other components of the host device can perform one or more other automated actions responsive to the one or more detected initiator-related conditions for the one or more paths. Examples of additional or alternative automated actions that may be performed by the MPIO driver are described elsewhere herein.

Multiple additional instances of the FIG. 2 process may be performed in respective additional host devices that share the storage array.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and initiator-related condition detection and resolution functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different initiator-related condition detection and resolution arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
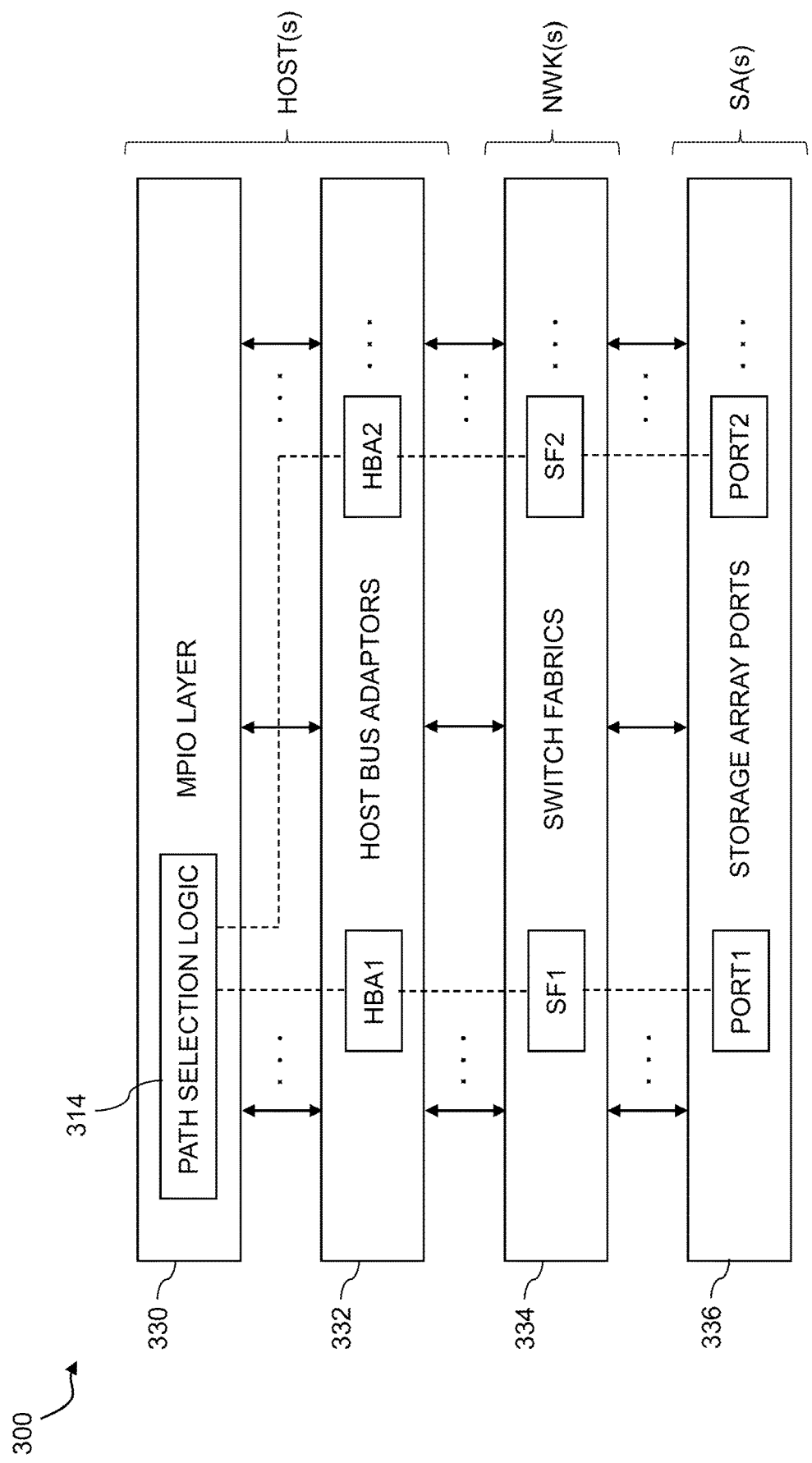
FIG. 3 is a block diagram showing multiple layers of a layered system architecture that includes a multi-path layer with functionality for detection and resolution of initiator-related conditions in an illustrative embodiment.

Referring now to FIG. 3, another illustrative embodiment is shown. In this embodiment, an information processing system 300 comprising at least one instance of path selection logic 314 is configured in accordance with a layered system architecture that includes an MPIO layer 330, an HBA layer 332, a switch fabric layer 334 and a storage array port layer 336. The MPIO layer 330 and the HBA layer 332 are associated with one or more host devices, the switch fabric layer 334 is associated with one or more SANs or other types of networks, and the storage array port layer 336 is associated with one or more storage arrays ("SAs"). The MPIO layer 330 is an example of what is also referred to herein as a multi-path layer, and comprises one or more MPIO drivers implemented in respective host devices. Each such MPIO driver illustratively comprises an instance of path selection logic 314 configured substantially as previously described. Additional or alternative layers and path selection logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 330 in this embodiment selects paths for delivery of IO operations to the one or more storage arrays having the storage array ports of the storage array port layer 336.

In some embodiments, the path selection logic 314 is configured to monitor performance of the storage array ports by utilizing predetermined commands to detect response time degradations at particular ports. For example, a given such predetermined command can be sent to a particular port over one or more paths to that port, and its response time measured, in conjunction with monitoring the performance of that port. Numerous other techniques can be used to monitor storage port performance in other embodiments, such as use of port load monitoring tools. Based on results of such port performance monitoring, the path selection logic 314 can detect initiator-related conditions. Automated adjustment of assignment of one or more HBAs to one or more storage ports is then performed in order to resolve the detected initiator-related conditions.

Additionally or alternatively, other automated actions can be taken in a path selection algorithm or other path selection mechanism of the path selection logic 314 to take fabric identifiers into account in the path selection process.

An additional example of an illustrative embodiment implemented using the FIG. 2 process for initiator-related condition detection and resolution in a multi-path layer will now be described. It is assumed in this embodiment that the MPIO driver of a given host device provides initiator-related condition detection and resolution functionality, under the control of a corresponding instance of path selection logic implemented in the MPIO driver, possibly with involvement of other host device components.

Some embodiments can include a relatively large number of host devices (e.g., 1000 or more host devices), although as indicated previously different numbers of host devices, and possibly only a single host device, may be present in other embodiments. In this example, it is assumed that each of a plurality of host devices is allocated with a sufficient number of HBAs to accommodate predicted performance needs. In some cases, the number of HBAs per host device is on the order of 4, 8 or 16 HBAs, although other numbers of HBAs could be allocated to each host device depending upon predicted performance needs. A typical storage array may include on the order of 128 ports, although again other numbers can be used based on the particular needs of the implementation. The number of host devices per storage array port in some cases can be on the order of IO host devices per port. The HBAs of the host devices are assumed to be zoned and masked to the storage array ports in accordance with the predicted performance needs, including user load predictions.

In the present example, it is assumed that the performance of each storage array port is monitored using a port load monitoring tool. A given such port load monitoring tool illustratively comprises a polling script that periodically polls the storage array ports for load information, although other types of port load monitoring tools or more generally other types of port performance monitoring techniques can be used. The monitoring of port performance for a given storage array port is assumed in the present example to include monitoring individual performance of each logical device that is accessible via that port. The performance can be measured in predetermined time intervals, with a performance measurement for a given such interval characterizing the performance over that interval.

It is further assumed that the present example utilizes machine learning techniques to determine characteristics relating to IO operations such as length of bursts, application correlation, pace of changes, etc.

A "heat map" or other set of information is generated based on the above-described port load monitoring. The heat map illustratively indicates for each of the storage array ports the port load for each of a plurality of logical devices accessible via that port on a per-initiator basis. The heat map therefore indicates which initiators are experiencing excessing port load in accessing particular logical devices via particular ports. Alternative data structures can be used in place of the heat map in other embodiments.

One or more initiator-related conditions are then detected using the heat map or other suitable data structure in the present example. For example, initiator-related conditions can include:

1. An indication that one or more active initiators are not needed at all and can be transitioned from an active state to an inactive state.

2. An indication that at least one initiator should be assigned to a different target port for accessing a particular logical device. For example, initiators communicating with certain logical devices on a given one of the ports might be creating a relatively large load, such that one or more of those initiators should therefore be reassigned to communicate with those logical devices over other less busy ports.

These and other indications can further include information specifying to which port the one or more initiators should be assigned for communication with one or more of the logical devices.

A mapping of initiators, targets and logical devices is illustratively updated to reflect an automated reassignment of one or more of the initiators to one or more of the targets for accessing one or more of the logical devices. The mapping in some embodiments indicates the particular storage array port which each HBA should utilize in accessing certain ones of the logical devices. Such a mapping is illustratively maintained by the one or more host devices, possibly with the involvement of or otherwise under the control of a corresponding MPIO driver and its path selection logic.

A given one of the host devices then initiates an automated reconfiguration process to redefine zoning and masking information that characterizes relationships between the initiators and the targets responsive to the automatic adjusting of the assignment of one or more of the initiators to one or more of the targets as reflected in the updating mapping of initiators, targets and logical devices.

Such an automated reconfiguration process can be configured to leverage known techniques such as target driven zoning to redefine the zoning between the host devices and the storage array ports. The storage array can then adapt logical device masking to the host devices in accordance with the redefined zoning.

The given host device can then initiate an automated path discovery process to discover new paths through the network responsive to the updated zoning and masking. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths. For example, the storage array in some embodiments can be configured to increment a counter if zoning and masking has changed, and the MPIO driver of the host device can utilize a log sense command, a mode sense command or a "vendor unique" or VU command to determine the current counter value and trigger path discovery based on a change in that value.

As indicated previously, the above-described port performance monitoring is illustratively repeated in each of a plurality of intervals. Such repeated port performance monitoring can determine in an on-going manner, after reassignment of one or more initiators to one or more targets responsive to a detected initiator-related condition, whether or not the reassignment has alleviated the detected condition, and additional automated adjustments can be made in the mapping of initiators, targets and logical devices as needed.

As mentioned previously, different instances of the above-described process can be performed by different MPIO drivers in different host devices.

The particular initiator-related condition detection and resolution arrangements described above are presented by way of illustrative example only. Numerous alternative arrangements of these and other features can be used in implementing the FIG. 2 process and other illustrative embodiments.

The illustrative embodiments disclosed herein can provide a number of significant advantages relative to conventional arrangements. For example, some embodiments configure a multi-path layer of one or more host devices to include functionality for detection and resolution of initiator-related conditions.

Such embodiments can advantageously avoid the time wasted under current practice in troubleshooting the storage system responsive to an apparent response time degradation when the actual problem relates to configuration and utilization of the paths from the host device to the storage system.

In addition, the need for tedious and time-consuming manual reconfiguration of the host device and any associated rebooting of the host device are avoided in illustrative embodiments.

Moreover, illustrative embodiments can alleviate performance issues resulting from network switch fabric reconfigurations, in which potentially large numbers of required state change notification (RSCN) messages are generated and transmitted over a given fabric. This type of excessive generation of RSCN messages is also referred to as an "RSCN storm." Conventional techniques are unable to adequately alleviate these and other fabric-related performance degradations.

Some illustrative embodiments can also avoid altogether one or more additional initiator-related conditions that might otherwise have arisen absent the detection and resolution functionality.

Such embodiments can also allow a host administrator to more efficiently address any initiator-related conditions that arise. Initiator-related condition notifications can also assist a storage administrator in understanding delayed command response times.

These and other arrangements are advantageously configured to provide efficient detection and resolution of initiator-related conditions even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different MPIO driver configurations and associated initiator-related condition detection and resolution arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system comprising a plurality of storage devices;
the host device comprising:
a plurality of host bus adaptors; and
a multi-path input-output driver configured to control delivery of input-output operations from the host device to the storage system over selected ones of a plurality of paths through the network;
the paths being associated with respective initiator-target pairs wherein each of the initiators comprises a corresponding one of the host bus adaptors of the host device and each of the targets comprises a corresponding one of a plurality of ports of the storage system;
wherein the host device is further configured:
to monitor performance of the ports of the storage system in processing input-output operations delivered thereto;
to detect an initiator-related condition based at least in part on the monitored performance of the ports; and
to automatically adjust an assignment of one or more of the initiators to one or more of the targets based at least in part on the detected initiator-related condition;
wherein detecting an initiator-related condition based at least in part on the monitored performance of the ports comprises implementing a machine learning algorithm to detect deviations from one or more learned characteristics relating to the input-output operations, the machine learning algorithm comprising at least one neural network configured to determine the one or more learned characteristics relating to the input-output operations over a period of time prior to detection of the initiator-related condition;
wherein the one or more learned characteristics relating to the input-output operations as determined by said at least one neural network of the machine learning algorithm comprise particular values of at least one of burst length, application correlation and change rate learned by the neural network over at least a portion of the period of time prior to the detection of the initiator-related condition;

wherein detecting an initiator-related condition based at least in part on the monitored performance of the ports comprises utilizing the one or more learned characteristics determined by the neural network to detect at least one initiator that is a candidate for assignment to a different target; and wherein automatically adjusting an assignment of one or more of the initiators to one or more of the targets based at least in part on the detected initiator-related condition comprises shifting the at least one detected initiator from a current target of the at least one initiator to the different target in accordance with one or more outputs of the machine learning algorithm.

2. The apparatus of claim 1 further comprising one or more additional host devices each configured to communicate over the network with the storage system and wherein each additional host device comprises a multi-path input-output driver configured to control delivery of input-output operations from that host device to the storage system over selected ones of a plurality of paths through the network.

3. The apparatus of claim 1 wherein detecting an initiator-related condition based at least in part on the monitored performance of the ports comprises detecting one or more initiators that each have a level of utilization below a specified threshold.

4. The apparatus of claim 1 wherein detecting an initiator-related condition based at least in part on the monitored performance of the ports comprises detecting a plurality of targets each of which is a candidate for assignment to a different initiator.

5. The apparatus of claim 1 wherein automatically adjusting an assignment of one or more of the initiators to one or more of the targets based at least in part on the detected initiator-related condition comprises shifting at least one of the initiators from a current target corresponding to a first port having a relatively high input-output processing load to an updated target corresponding to a second port having a relatively low input-output processing load.

6. The apparatus of claim 1 wherein automatically adjusting an assignment of one or more of the initiators to one or more of the targets based at least in part on the detected initiator-related condition comprises adjusting at least one mapping of initiators, targets and logical devices that indicates for each of the initiators at least one target that is to be used to communicate with a given logical device of the storage system.

7. The apparatus of claim 1 wherein the host device is further configured to initiate an automated reconfiguration process to redefine zoning and masking information that characterizes relationships between the initiators and the targets responsive to the automatically adjusting of the assignment of one or more of the initiators to one or more of the targets.

8. The apparatus of claim 1 wherein the host device is further configured to initiate an automated path discovery process to discover new paths through the network responsive to the automatically adjusting of the assignment of one or more of the initiators to one or more of the targets.

9. The apparatus of claim 1 wherein the host device is further configured to send a predetermined command to the storage system to determine if zoning and masking information has been changed.

10. The apparatus of claim 9 wherein the predetermined command comprises at least one of a log sense command, a mode sense command and a vendor unique command.

11. The apparatus of claim 1 wherein at least a subset of the monitoring, detecting and automatically adjusting are performed at least in part by the multi-path input-output driver of the host device.

12. A method comprising:

controlling, in a multi-path input-output driver of a host device, delivery of input-output operations from the host device to a storage system over selected ones of a plurality of paths through a network, the paths being associated with respective initiator-target pairs wherein each of the initiators comprises a corresponding one of a plurality of host bus adaptors of the host device and each of the targets comprises a corresponding one of a plurality of ports of the storage system;

monitoring performance of the ports of the storage system in processing input-output operations delivered thereto;

detecting an initiator-related condition based at least in part on the monitored performance of the ports; and automatically adjusting an assignment of one or more of the initiators to one or more of the targets based at least in part on the detected initiator-related condition;

wherein detecting an initiator-related condition based at least in part on the monitored performance of the ports comprises implementing a machine learning algorithm to detect deviations from one or more learned characteristics relating to the input-output operations, the machine learning algorithm comprising at least one neural network configured to determine the one or more learned characteristics relating to the input-output operations over a period of time prior to detection of the initiator-related condition;

wherein the one or more learned characteristics relating to the input-output operations as determined by said at least one neural network of the machine learning algorithm comprise particular values of at least one of burst length, application correlation and change rate learned by the neural network over at least a portion of the period of time prior to the detection of the initiator-related condition;

wherein detecting an initiator-related condition based at least in part on the monitored performance of the ports comprises utilizing the one or more learned characteristics determined by the neural network to detect at least one initiator that is a candidate for assignment to a different target; and wherein automatically adjusting an assignment of one or more of the initiators to one or more of the targets based at least in part on the detected initiator-related condition comprises shifting the at least one detected initiator from a current target of the at least one initiator to the different target in accordance with one or more outputs of the machine learning algorithm.

13. The method of claim 12 wherein automatically adjusting an assignment of one or more of the initiators to one or more of the targets based at least in part on the detected initiator-related condition comprises shifting at least one of the initiators from a current target corresponding to a first port having a relatively high input-output processing load to an updated target corresponding to a second port having a relatively low input-output processing load.

14. The method of claim 12 wherein automatically adjusting an assignment of one or more of the initiators to one or more of the targets based at least in part on the detected initiator-related condition comprises adjusting at least one mapping of initiators, targets and logical devices that indicates for each of the initiators at least one target that is to be used to communicate with a given logical device of the storage system.

15. A computer program product comprising a non-transitory processor-readable storage medium having stored therein program code of one or more software programs, wherein the program code, when executed by a host device comprising a multi-path input-output driver, the host device being configured to communicate over a network with a storage system, causes the host device:

to control, in the multi-path input-output driver of the host device, delivery of input-output operations from the host device to the storage system over selected ones of a plurality of paths through the network, the paths being associated with respective initiator-target pairs wherein each of the initiators comprises a corresponding one of a plurality of host bus adaptors of the host device and each of the targets comprises a corresponding one of a plurality of ports of the storage system;

to monitor performance of the ports of the storage system in processing input-output operations delivered thereto;

to detect an initiator-related condition based at least in part on the monitored performance of the ports; and to automatically adjust an assignment of one or more of the initiators to one or more of the targets based at least in part on the detected initiator-related condition;

wherein detecting an initiator-related condition based at least in part on the monitored performance of the ports comprises implementing a machine learning algorithm to detect deviations from one or more learned characteristics relating to the input-output operations, the machine learning algorithm comprising at least one neural network configured to determine the one or more learned characteristics relating to the input-output operations over a period of time prior to detection of the initiator-related condition;

wherein the one or more learned characteristics relating to the input-output operations as determined by said at least one neural network of the machine learning algorithm comprise particular values of at least one of burst length, application correlation and change rate learned by the neural network over at least a portion of the period of time prior to the detection of the initiator-related condition;

wherein detecting an initiator-related condition based at least in part on the monitored performance of the ports comprises utilizing the one or more learned characteristics determined by the neural network to detect at least one initiator that is a candidate for assignment to a different target; and wherein automatically adjusting an assignment of one or more of the initiators to one or more of the targets based at least in part on the detected initiator-related condition comprises shifting the at least one detected initiator from a current target of the at least one initiator to the different target in accordance with one or more outputs of the machine learning algorithm.

16. The computer program product of claim 15 wherein automatically adjusting an assignment of one or more of the initiators to one or more of the targets based at least in part on the detected initiator-related condition comprises shifting at least one of the initiators from a current target corresponding to a first port having a relatively high input-output processing load to an updated target corresponding to a second port having a relatively low input-output processing load.

17. The computer program product of claim 15 wherein automatically adjusting an assignment of one or more of the initiators to one or more of the targets based at least in part on the detected initiator-related condition comprises adjusting at least one mapping of initiators, targets and logical devices that indicates for each of the initiators at least one target that is to be used to communicate with a given logical device of the storage system.

18. The computer program product of claim 15 wherein detecting an initiator-related condition based at least in part on the monitored performance of the ports comprises detecting one or more initiators that each have a level of utilization below a specified threshold.

19. The computer program product of claim 15 wherein the host device is further configured to initiate an automated reconfiguration process to redefine zoning and masking information that characterizes relationships between the initiators and the targets responsive to the automatically adjusting of the assignment of one or more of the initiators to one or more of the targets.

20. The computer program product of claim 15 wherein the host device is further configured to initiate an automated path discovery process to discover new paths through the network responsive to the automatically adjusting of the assignment of one or more of the initiators to one or more of the targets.

* * * * *